(12) United States Patent
Ahmed-Zaid et al.

(10) Patent No.: US 10,811,879 B2
(45) Date of Patent: Oct. 20, 2020

(54) RESIDENTIAL STATIC VAR COMPENSATOR APPARATUS AND METHOD

(71) Applicant: BOISE STATE UNIVERSITY, Boise, ID (US)

(72) Inventors: Said Ahmed-Zaid, Boise, ID (US); Muhammad Kamran Latif, Boise, ID (US)

(73) Assignee: Boise State University, Boise, ID (US)

( * ) Notice: Subject to any disclaimer, the term of this patent is extended or adjusted under 35 U.S.C. 154(b) by 498 days.

(21) Appl. No.: 15/798,675

(22) Filed: Oct. 31, 2017

(65) Prior Publication Data

US 2019/0129459 A1    May 2, 2019

(51) Int. Cl.
  *H02J 3/18*    (2006.01)
  *G05F 1/70*    (2006.01)
  *H02M 1/42*    (2007.01)
  *H02M 5/293*   (2006.01)

(52) U.S. Cl.
  CPC ............ *H02J 3/185* (2013.01); *G05F 1/70* (2013.01); *H02J 3/1864* (2013.01); *H02M 1/4208* (2013.01); *H02M 5/293* (2013.01)

(58) Field of Classification Search
  CPC .. G05F 1/613; G05F 1/70; H02J 3/185; H02J 3/1864; H02M 1/4208; H02M 5/293; G06Q 50/06
  See application file for complete search history.

(56) References Cited

U.S. PATENT DOCUMENTS

| 5,422,561 A * | 6/1995 | Williams | H02J 3/1821 307/31 |
| 5,747,972 A | 5/1998 | Baretich et al. | |
| 2014/0368173 A1* | 12/2014 | Banno | H02M 5/2573 323/235 |

OTHER PUBLICATIONS

Bhowmik et al., State Space Analysis and Duty Cycle Control of a Switched Reactance based Center-Point-Clamped Reactive Power Compensator, Mar. 2016, IEEE, 2016 IEEE APEC, 2706-2713 (Year: 2016).*
Hua Jin, An Efficient Switched-Reactor-Based Static VAR Compensator; IEEE Transactions on Industry Applications, vol. 30, No. 4, Jul./Aug. 1994.

(Continued)

*Primary Examiner* — Jue Zhang
(74) *Attorney, Agent, or Firm* — Parsons Behle & Latimer

(57) ABSTRACT

A static volt-ampere reactive (VAR) compensator apparatus includes a capacitor electrically coupled between a phase conductor and a neutral conductor. The apparatus further includes a first switch electrically coupled between the phase conductor and an intermediate node. The apparatus also includes an inductor electrically coupled between the intermediate node and the neutral conductor in series with the first switch. The apparatus includes a second switch electrically coupled between the intermediate node and the neutral conductor in parallel with the inductor. The apparatus further includes a controller configured to transmit signals to the first switch and the second switch that cause the apparatus to modulate between a first state, in which the first switch is open and the second switch is closed, and a second state, in which the first switch is closed and the second switch is open.

19 Claims, 5 Drawing Sheets

(56) References Cited

OTHER PUBLICATIONS

Sanghun Kim et al, Reactive Power Compensation Using Switching Cell Structured Direct PWM AC-AC Converter; 2016 IEEE 8th International Power Electronics and Motion Control Conference (IPEMC-ECCE Asia) 2016.

M. Ziegler, W. Hofmann; Semi Natural Two Steps Commutation Strategy for Matrix Converters 1998.

Mr L Empringham et al; Intelligent Commutation of Matrix Converter Bi-Directional Switch Cells Using Novel Gate Drive Techniques; Power Electronics, Machines and Control Group, University of Nottingham, England 1998.

B.-H. Kwon et al; Novel Commutation Technique of AC-AC Converters; IEE Proc-Electr. Power Appl, vol. 145 No. 4 Jul. 1998.

Christian Klumpner et al; A New Matrix Converter Motor (MCM) for Industryapplication; IEEE Transactions on Industrial Electronics, vol. 49, No. 2, Apr. 2002.

J.L. Galvez et al; Intelligent Bidirectional Power Switch Module for Matrix Converter Applications 2017.

Patrick W. Wheeler; Matrix Converters: A Technology Review; IEEE Transactions on Industrial Electronics, vol. 49, No. 2, Apr. 2002.

Lee Empringham et al; A Matrix Converter Induction Motor Drive Using Intelligent Gate Drive Level Current Commutation Techniques 1936.

Jochen Mahlein et al; Matrix Converter Commutation Strategies With and Without Explicit Input Voltage Sign Measurement; IEEE Transactions on Industrial Electronics, vol. 49, No. 2, Apr. 2002.

Canadian Intellectual Property Office; Examination Report; Canadian Patent Application No. 3,022,725; dated Sep. 11, 2019.

Hua et al., "An Efficient Switched-Reactor-Based Static Var Compensator", IEEE Jul./Aug. 1994.

* cited by examiner

RESIDENTIAL STATIC VAR COMPENSATOR APPARATUS AND METHOD

FIELD OF THE DISCLOSURE

This disclosure is related to the field of static volt-ampere reactive (VAR) compensators and in particular, residence-side local static VAR compensators.

BACKGROUND

As demand for electric power throughout the world expands, power management and conservation within electric distribution grids will become increasingly important. Within residential power distribution, some power loads may consume less power when they are fed with a voltage that is lower than the nominal voltage designated for the load. Practicing conservation by voltage reduction (CVR) may enable an electric utility to reduce overall power consumption within a distribution system.

Electric companies may apply CVR on a distribution feeder using a load tap-changing transformer (LTC) positioned at a distribution substation. The LTC decreases the feeder voltages. However, because every distribution circuit has its own load demand characteristic, it may become difficult for electric utilities to impose one particular strategy for energy savings from one distribution feeder to another. As such, in typical LTC configurations it may be challenging to keep the end-of-line (EOL) voltage within an acceptable range (i.e., within standards set by the American National Standards Institute (ANSI) or other standards bodies).

In order to benefit from CVR, electric utilities may install fixed capacitors or switched capacitor banks at different points along the distribution network to boost the voltage along the circuit. This permits electric utilities to lower the voltage at the substation and safely operate within an acceptable range at an EOL. Electric utilities may also use inline voltage regulators to flatten the voltage levels along the distribution network. However, these solutions do not take into account individual load requirements per residence. In particular, reactive power consumed by reactive elements at a load may increase power losses within a distribution system.

Shunt capacitors may be used to provide reactive power compensation in a distribution system. But with widely varying loads, fixed shunt capacitors can often lead to either under-compensation or over-compensation. Dynamic reactive power compensation can be achieved using switchable capacitor banks. Within the capacitor banks, individual capacitors can be switched, either on or off, using thyristor controls in discrete steps depending on the reactive power needs. A thyristor controlled reactor (TCR) may also be used in conjunction with a fixed capacitor. However, conventional thyristor reactor switching may be inefficient and may create resonance between the capacitor and a source impedance, thereby generating undesirable harmonics. To compensate for the harmonics, thyristor-controlled reactors may be connected in a three-phase delta configuration. This configuration may trap any triplen harmonics that may be present. The development of a thyristor-controlled reactor in a single-phase system may present difficulties, due to a non-sinusoidal reactor current and low-order harmonics. Further, VAR compensation resulting from a thyristor-controlled reactor may not be continuous, occurring only once in each half cycle. Other disadvantages may exist.

SUMMARY

Described is a residential static VAR compensator apparatus and method that may overcome at least one of the disadvantages described above. The VAR compensator apparatus may include two bidirectional switches operated in a complementary manner. The bidirectional switches may be controlled using pulse-width modulation (PWM) (e.g., by varying a duty cycle associated with each switch).

In an embodiment, a VAR compensator apparatus includes a capacitor electrically coupled between a phase conductor and a neutral conductor. The apparatus further includes a first switch electrically coupled between the phase conductor and an intermediate node. The apparatus also includes an inductor electrically coupled between the intermediate node and the neutral conductor in series with the first switch. The apparatus includes a second switch electrically coupled between the intermediate node and the neutral conductor in parallel with the inductor. The apparatus further includes a controller configured to transmit signals to the first switch and the second switch that cause the apparatus to modulate between a first state, in which the first switch is open and the second switch is closed, and a second state, in which the first switch is closed and the second switch is open.

In some embodiments, the phase conductor is configured to receive a single phase power signal therethrough. In some embodiments, the apparatus passes between the first state and the second state according to a first set of intermediate states when a voltage at the phase conductor is positive, and the apparatus passes between the first state and the second state according to a second set of intermediate states when a voltage at the phase conductor is negative. In some embodiments, the apparatus passes between the first state and the second state according to a first set of intermediate states when a current through the inductor from the phase conductor to the neutral conductor is positive, and the apparatus passes between the first steady state and the second steady state through a second set of transient states when a current through the inductor from the phase conductor to the neutral conductor is negative.

In some embodiments, the first switch is a bidirectional switch having a first switch-diode pair and a second switch-diode pair electrically coupled in an antiparallel configuration, and the second switch is a bidirectional switch having a first switch-diode pair and a second switch-diode pair electrically coupled in an antiparallel configuration. In some embodiments, the controller is configured to suspend modulating between the first steady state and the second steady state when a voltage at the phase conductor is within a threshold voltage of zero. In some embodiments, the controller is configured to return the apparatus to the first state before suspending modulating between the first steady state and the second steady state. In some embodiments, a duty cycle of the first switch and the second switch is adjustable to alter an effective inductance of the apparatus. In some embodiments, a modulation frequency of the first switch and the second switch is between 3 kHz and 12 kHz.

In an embodiment, a power distribution system includes a feeder including a phase conductor and a neutral conductor. The system further includes one or more static VAR compensator apparatuses positioned between the feeder and one or more gateways. Each static VAR compensator apparatus includes a capacitor electrically coupled between the phase conductor and the neutral conductor. Each apparatus further includes a first switch electrically coupled between the phase conductor and an intermediate node. Each apparatus also includes an inductor electrically coupled between the intermediate node and the neutral conductor in series with the first switch. Each apparatus includes a second switch electrically coupled between the intermediate node and the neutral conductor in parallel with the inductor. Each apparatus further includes a controller configured to transmit signals to the first switch and the second switch that cause the VAR compensator apparatus to modulate between a first steady state, in which the first switch is open and the second switch is closed, and a second steady state, in which the first switch is closed and the second switch is open.

In some embodiments, the phase conductor is configured to receive a single phase power signal therethrough. In some embodiments, each VAR compensator apparatus passes between the first steady state and the second steady state through a first set of transient states when a voltage at the phase conductor is positive, and wherein the apparatus passes between the first steady state and the second steady state according to a second set of transient states when a voltage at the phase conductor is negative. In some embodiments, each VAR compensator apparatus passes between the first steady state and the second steady state through a first set of transient states when a current through the inductor from the phase conductor to the neutral conductor is positive, and each apparatus passes between the first steady state and the second steady state through a second set of transient states when a current through the inductor from the phase conductor to the neutral conductor is negative.

In some embodiments, the first switch is a bidirectional switch having a first switch-diode pair and a second switch-diode pair electrically coupled in an antiparallel configuration, and the second switch is a bidirectional switch having a first switch-diode pair and a second switch-diode pair electrically coupled in an antiparallel configuration. In some embodiments, the controller is configured to suspend modulating between the first steady state and the second steady state when a voltage at the phase conductor is within a threshold voltage of zero. In some embodiments, a modulation frequency of the first switch and the second switch is adjustable to alter an effective inductance of each individual apparatus. In some embodiments, the system does not include harmonic filter devices between the feeder and each of the respective gateways. In some embodiments, each static VAR compensator apparatus is configured to measure load characteristics associated with each of the respective gateways and to determine whether to modulate between the first state and the second state based on a minimum power-point tracker algorithm. In some embodiments, the system includes at least one additional VAR compensator apparatus positioned between the feeder and at least one additional gateway.

In an embodiment, a method includes providing capacitance between a phase conductor and a neutral conductor. The method further includes providing a first switch electrically coupled between the phase conductor and an intermediate node. The method also includes providing inductance between the intermediate node and the neutral conductor. The method includes providing a second switch electrically coupled between the intermediate node and the neutral node. The method further includes transmitting signals to the first switch and the second switch that cause the first switch and the second switch to modulate between a first state, in which the first switch is open and the second switch is closed, and a second state, in which the first switch is closed and the second switch is open.

In some embodiments, the method includes receiving a single phase power signal through the phase conductor. In some embodiments, modulating between the first state and the second state comprises passing between the first state and the second state according to a first set of intermediate states when a voltage at the phase conductor is positive, and passing between the first state and the second state according to a second set of intermediate states when a voltage at the phase conductor is negative.

Figure 1:
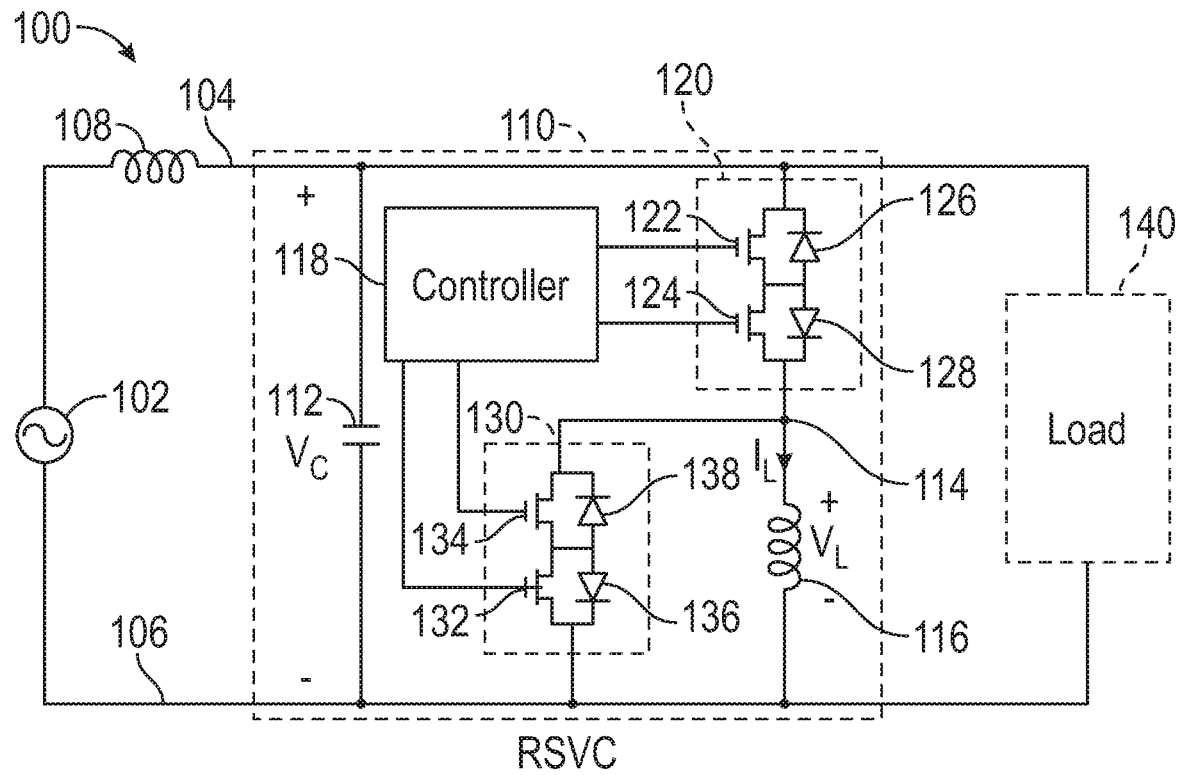
FIG. 1 is a schematic block diagram depicting an embodiment of a power distribution circuit including an embodiment of a residential static VAR compensator apparatus.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a power distribution system 100 is depicted. The power distribution system 100 may include a power source 102, a phase conductor 104, and a neutral conductor 106. The phase conductor 104 may couple the power source 102 to a load 140 and the neutral conductor 106 may provide a return from the load 140 to the power source 102. The power source 102 may correspond to a transformer within an electrical distribution infrastructure and the phase conductor 104 may correspond to a feeder within the electrical distribution infrastructure as described herein. Due to the length of typical feeder, significant leakage reactance may occur within the phase conductor 104. Leakage reactance within the phase conductor 104 may be modeled as an inductor 108. It should be noted that the inductor 108 may not correspond to a physical inductor component, but is instead shown in FIG. 1 as an effective equivalent of a feeder having significant length.

A residential static VAR compensator apparatus 110 may be positioned between the source 102 and the load 140. The apparatus 110 may include a capacitor 112, an inductor 116, a first switch 120, and a second switch 130. The capacitor 112 may be coupled between the phase conductor 104 and the neutral conductor 106. The first switch 120 may be coupled between the phase conductor 104 and an intermediate node 114. The inductor 116 may be coupled between the intermediate node 114 and the neutral conductor 106. The second switch 130 may be coupled between the intermediate node 114 and the neutral conductor 106 in parallel with the inductor 116.

The first switch 120 may be a bidirectional switch. For example, the first switch 120 may include a first sub-switch 122 with a corresponding diode 126 and a second sub-switch 124 with a corresponding diode 128. The first and second sub-switches 122, 124 may be implemented using metal-oxide semiconductor field-effect transistors (MOSFETs), insulated gate bipolar transistors (IGBTs), or other types of semiconductor switches.

The first sub-switch 122 and its corresponding diode 126 may be referred to as a first switch-diode pair. The second sub-switch 124 and its corresponding diode 128 may be referred to as a second switch-diode pair. As shown in FIG. 1, the first switch-diode pair and the second switch-diode pair may be coupled in an antiparallel configuration. For example, an anode of the diode 126 associated with the first sub-switch 122 may be coupled to an anode of the diode 128 associated with the second sub-switch 124. Likewise, a source of the sub-switch 122 may be coupled to a source of the sub-switch 124. The sources of the sub-switches 122, 124 may also be coupled to the anodes of the diodes 126, 128. A drain of the first sub-switch 122 and a cathode of its associated diode 126 may be coupled to the phase source 104. A drain of the second sub-switch 124 and a cathode of its associated diode 128 may be coupled to the intermediate node 114.

The second switch 130 may also be a bidirectional switch. For example, the second switch 130 may include a first sub-switch 132 with a corresponding diode 136 and a second sub-switch 134 with a corresponding diode 138. The first and second sub-switches 132, 134 may be implemented using metal-oxide semiconductor field-effect transistors (MOSFETs)), insulated gate bipolar transistors (IGBTs), or other types of semiconductor switches.

The first sub-switch 132 and its corresponding diode 136 may be referred to as a first switch-diode pair. The second sub-switch 134 and its corresponding diode 138 may be referred to as a second switch-diode pair. As with the first switch 120, the first switch-diode pair and the second switch-diode pair of the second switch 130 may be coupled in an antiparallel configuration. For example, an anode of the diode 136 associated with the first sub-switch 132 may be coupled to an anode of the diode 138 associated with the second sub-switch 134. Likewise, a source of the sub-switch 132 may be coupled to a source of the sub-switch 134. The sources of the sub-switches 132, 134 may also be coupled to the anodes of the diodes 136, 138. A drain of the first sub-switch 132 and a cathode of its associated diode 136 may be coupled to the neutral conductor 106. A drain of the second sub-switch 134 and a cathode of its associated diode 138 may be coupled to the intermediate node 114.

The apparatus 110 may further include a controller 118. The controller may include any circuitry capable of providing gate voltages to each of sub-switches 122, 124, 132, 134 to open or close the first switch 120 and the second switch 130 in a complementary manner as disclosed herein. The controller 118 may be implemented using a field programmable gate array (FPGA), a peripheral interface controller (PIC), a microprocessor, another type of control unit, or combinations thereof. In some embodiments, a set of instructions may be stored at a non-transitory computer readable medium. The instructions, when executed by a processor may cause the processor to perform operations for controlling the switches 120, 130, as described herein.

During operation, power may be provided to the load 140 from the power source 102. The load 140 may exhibit reactive power. The capacitor 112 may provide capacitance between the phase conductor 104 and the neutral conductor 106 to compensate for the reactive power exhibited by the load 140. The inductor 116 may be used to adjust the reactance of the apparatus 110 (e.g., the inductor 116 may adjust the compensation provided by the capacitor 112).

The second switch 130 may be used to conduct reactor current when the first switch 120 is open and vice versa. By using high frequency switching, the reactive power generated by the inductor 116 can be controlled.

To illustrate, when the first switch 120 is closed (the second switch 130 is open), the input voltage $V_{IN,RMS}$ may appear across the inductor 116. This reactor voltage $V_{L,RMS}$ may be expressed by the following equation:

$$V_{L,RMS} = V_{IN,RMS} D$$

where D is the duty cycle ratio, defined as the time interval when the first switch 120 is conducting. Similarly, the fundamental component of reactor current $I_{L1,RMS}$ can be expressed as follows:

$$I_{L1,RMS} = \frac{I_{IN,RMS}}{D}$$

where D is the duty cycle for the first switch 120. From the above equations, the equivalent input inductive reactance, $X_{IN,RMS}$, can be found by using the following expression:

$$X_{IN} = \frac{V_{IN,RMS}}{I_{IN,RMS}} = \frac{V_{L,RMS}/D}{I_{L1,RMS}/D} = \frac{X_L}{D^2}$$

where $X_L$ is the reactance of the reactor. From this equation, it can be seen that the input reactance $X_{IN,RMS}$ can be controlled by varying the duty cycle D. This makes the reactance of a fixed reactor $X_L$ appear as a continuously variable reactance, i.e., as a function of duty cycle. The dynamic reactive power generated by the PWM-based switched reactor can be expressed as follows:

$$Q_L(D) = \frac{V_{IN}^2}{X_{IN}(D)}$$

It can be seen that, by increasing the duty cycle, the input inductive reactance $X_{IN}$ decreases, while the supplied reactive power increases. The controller 118 may be used to control the duty cycle associated with the first switch 120 and the second switch 130.

A benefit of the apparatus 110 is that there may be a noticeable improvement in the performance of the apparatus 110 (relying on the PWM-based switched reactance described above) compared to conventional TCR. Further, the apparatus 110 provides an alternative path for the reactor current through the second switch 130. This free-wheeling current path is helpful in keeping the reactor current sinusoidal and may reduce or eliminate the requirement for additional filtering circuits for limiting the harmonics in the reactor current. Thus, the apparatus 110 may be used for single phase devices, commonly found in residences, and may be used without the inclusion of harmonic filters between the phase conductor 104 and the load 140. Other benefits may exist.

Figure 2:
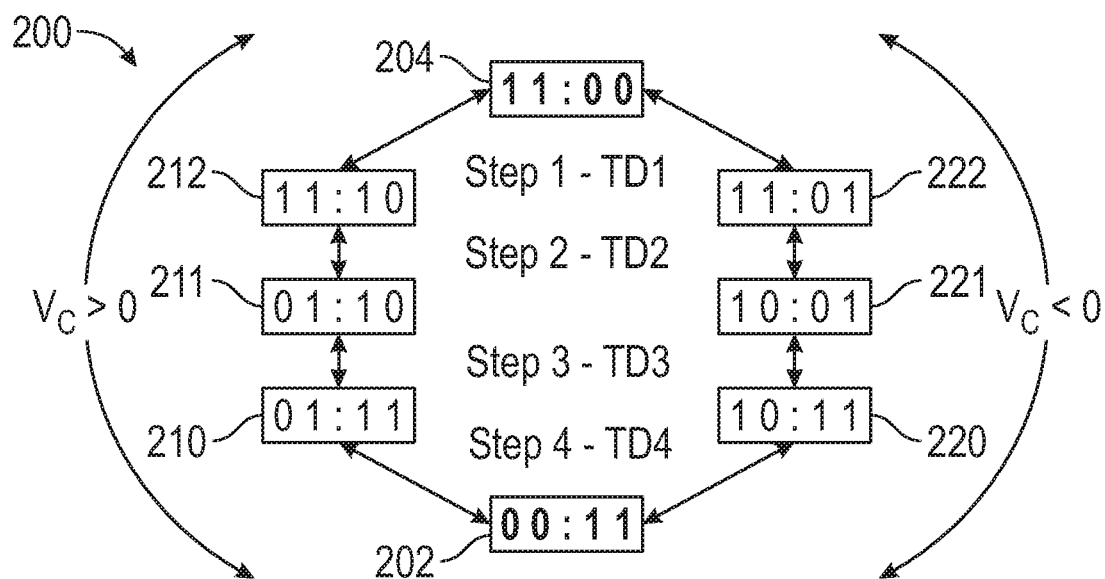
FIG. 2 is a diagram depicting an embodiment of a set of state transitions of an embodiment of a residential static VAR compensator apparatus based on voltage.

Referring to FIG. 2, an embodiment of a set of states 200 and transitions therebetween of the apparatus 110 are depicted. Transitions between states may be effected based on a measured voltage between the phase conductor 104 and the neutral conductor 106. Within each of the states, binary digits may represent the state of switches. For example, a binary 1 may indicate a switch is closed while a binary 0 may indicate that a switch is open. For each state of the set of states 200, from left to right, a first binary digit may indicate a state of the first sub-switch 122 of the first switch 120. A second binary digit may indicate a state of the second sub-switch 124 of the first switch 120. A third binary digit may indicate a state of the first sub-switch 132 of the second switch 130. A fourth binary digit may indicate a state of the second sub-switch 134 of the second switch 130.

The set of states 200 may include a first steady state 202 and a second steady state 204. While in the first steady state 202, the first switch 120 may be open, while the second switch 130 is closed. While in the second steady state 204, the first switch 120 may be closed, while the second switch 130 is open. The controller 118 may be used to modulate the apparatus 100 between the first steady state 202 and the second steady state 204 according to a desired duty cycle in order to affect the effective inductance of the inductor 116 and ultimately the reactive power generated by the apparatus 110. This duty cycle may be adjusted depending on factors such as the load 140. Further, the controller 118 may cycle between the first state 202 and the second state 204 at a fixed frequency. In some embodiments, the frequency is between 3 kHz and 12 kHz.

An effective commutation strategy may be employed to transition the apparatus 110 between the first steady state 202 and the second steady state 204 without creating a short circuit between the phase conductor 104 and the neutral conductor 106 and without interrupting the output load 140. Either of these conditions may cause damage to the switches 120, 130 or to other portions of the system 100.

Commutation between the first steady state 202 and the second steady state 204 may be performed via a first set of intermediate states 210, 211, 212 when a voltage at the phase conductor 104 is positive (i.e., when the capacitor voltage from the phase conductor 104 to the neutral conductor 106 is positive). For example, when passing from the first steady state 202 to the second steady state 204, the apparatus 110 may quickly pass first to a first intermediate state 210, then to a second intermediate state 211, then to a third intermediate state 212, and finally to the second steady state 204 where it will remain until it is time to return to the first steady state 202 based on the modulation frequency. In returning to the first steady state 202, the apparatus 110 may pass through each of the states 210, 211, 212 in reverse.

Likewise, commutation between the first steady state 202 and the second steady state 204 may be performed via a second set of intermediate states 220, 221, 222 when a voltage at the phase conductor 104 is negative (i.e., when the capacitor voltage from the phase conductor 104 to the neutral conductor 106 is negative).

Transition to any of the states 210, 211, 212 while the voltage at the phase conductor is negative may result in a short circuit or interruptions to the load 140. Likewise, transitions to any of the states 220, 221, 222 while the voltage at the phase conductor is positive may also result in short circuit or interruptions. As such, these combinations of states and voltages may be avoided.

Detection of the voltage sign may be done using a high-accuracy analog-to-digital converter (ADC). For example, in an embodiment, a Maxim Integrated Santa FE (MAXREFDES5#) ADC was used. This ADC is capable of 16-bit high-accuracy analog to digital conversion that accepts −10V to +10V bipolar analog signals. The digital output from the ADC may then be passed to the controller 118 for execution of the proper state machine sequence.

Figure 3:
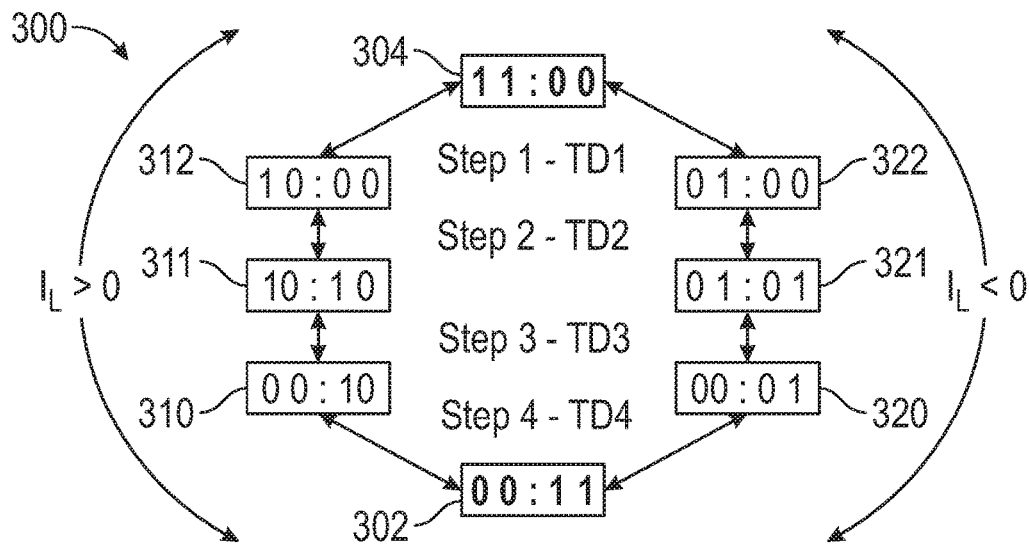
FIG. 3 is a diagram depicting an embodiment of a set of transitions of an embodiment of a residential static VAR compensator apparatus based on current.

Referring to FIG. 3, an embodiment of a set of states 300 and transitions therebetween of the apparatus 110 are depicted. Transitions between states may be effected based on a measured current between the phase conductor 104 and the neutral conductor 106 through the inductor 116.

Commutation between a first steady state 302 and a second steady state 304 may be performed via a first set of intermediate states 310, 311, 312 when a current between the phase conductor 104 and the neutral conductor 106 through the inductor 116 is positive. Likewise, commutation between the first steady state 302 and the second steady state 304 may be performed via a second set of intermediate states 320, 321, 322 when a current between the phase conductor 104 and the neutral conductor 106 through the inductor 116 is negative.

Transition to any of the states 310, 311, 312 while the current is negative may result in a short circuit or interruptions to the load 140. Likewise, transitions to any of the states 320, 321, 322 while the current is positive may also result in short circuit or interruptions. As such, these combinations of states and currents may be avoided.

A benefit of having a commutation strategy as illustrated by either FIG. 2 or FIG. 3 is that short circuits and interruptions to the load 140 may be avoided while the apparatus 110 provides reactive power to maintain voltage levels at a residence during implementation of CVR over a power distribution system. Other benefits may exist.

Figure 4:
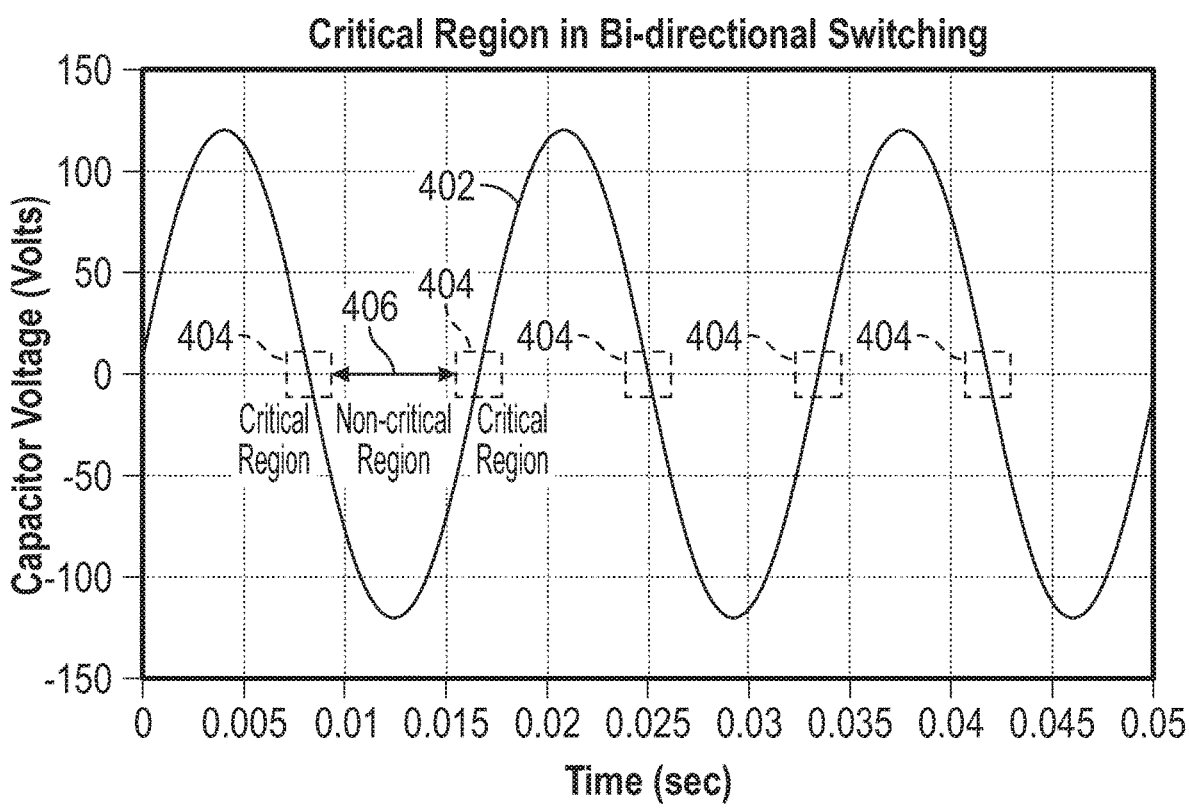
FIG. 4 is a graph depicting a single phase power signal with critical regions.

Referring to FIG. 4, a graph 400 depicting a single phase power signal is depicted. The graph includes an AC waveform 402. The AC waveform 402 expresses an AC voltage (y-axis) over time (x-axis) at the phase conductor 104. While input voltage-based current commutation is a reliable method for commutating current from the first switch 120 to the second switch 130, the detection of the voltage sign becomes important near the zero-crossing of the phase-to-neutral voltage. In order to safely commutate from one switch to another, the controller 118 may stop the state machine of FIG. 2 near the zero crossing.

For example, critical regions 404 may be defined based on a threshold voltage relative to zero volts. When the single phase power signal is within a threshold voltage of zero volts, i.e., within the critical regions 404, the controller 118 may stop modulating between the first steady state 202 and the second steady state 204. A similar concept may also be applied to the state machine of FIG. 3.

Before suspending modulation of the switches 120, 130, the controller 118 may be configured to return the apparatus 110 to the first steady state 202. While in the first steady state, the inductor 116 may be essentially removed from the system 100, thereby ensuring the voltage does not drop below minimum standards. When the AC waveform 402 leaves the critical regions 404 and enters a non-critical region 406, modulation of the switches 120, 130 may resume.

By suspending modulation of the switches 120, 130 during the critical regions 404, difficulties with accurately testing the sign of the AC waveform 402 may be avoided, thereby reducing the risk of short circuiting or other problems. Other benefits may exist.

Figure 5:
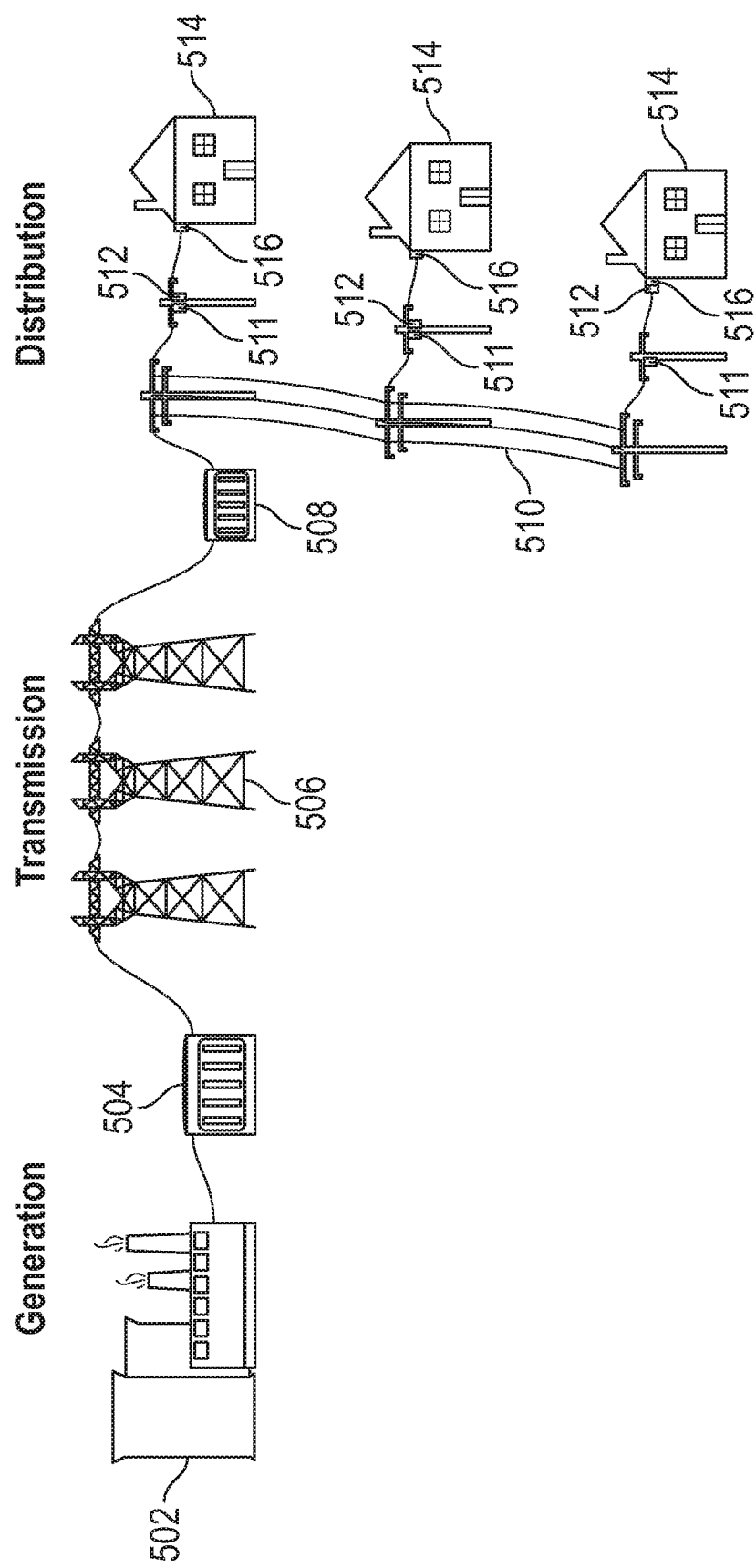
FIG. 5 is a diagram depicting an embodiment of a power distribution system.

Referring to FIG. 5, an embodiment of a power distribution system 500 is depicted. The power distribution system 500 may include a power source 502, a step-up transformer 504, a transmission line 506, a step-down transformer 508, and a feeder 510. From the feeder 510, multiple residences 514 may be coupled to the system 500.

The feeder 510 may include a phase conductor and a neutral conductor (not shown) as described herein, which may couple to each of the residences via gateways 516. A gateway, as used herein may include a meter, a breaker panel, or another component that separates electrical conductors to be used for a single residence or premises, such as a home, apartment, or work space, from electrical conductors shared between multiple residences or premises.

The system 500 may include one or more static VAR compensator apparatuses 512 positioned between the feeder 510 and the gateways 516. The apparatuses 512 may correspond to or incorporate the apparatuses 110 described with reference to FIG. 1. The feeder 510 may also couple to transformers 511 to provide single phase power to each of the residences 514. Because the apparatuses 512 reduce harmonics associated with static VAR compensation, the system 500 may omit harmonic filter devices between the feeder 510 and the gateways 516. As depicted in FIG. 5, in some cases, the VAR compensator apparatuses 512 may be positioned on a pole, or other location near the feeder 510, while in other cases, the apparatuses 512 may be positioned at, or as near as possible to, the gateways 516.

In order to reduce power consumed by the system 500, a minimum power-point tracking (mPPT) algorithm may be employed. Maximum power-point tracking (MPPT) has been successfully applied to solar power generation, wind power generation, and other systems where an increase of power extraction is desired. In mPPT systems, a decrease of power consumption is desired rather than an increase.

In MPPT, a single operating point (i.e., the maximum power point) may be calculated where the values of current (I) and voltage (V) result in a maximum power output. A source impedance may be adjusted to ensure that a power generator operates at that point. An algorithm may be implemented to periodically verify and adjust the source impedance to ensure continual operation at the maximum power point.

In mPPT, a similar approach may be taken. For example, the controller 118 of FIG. 1 may be configured to periodically calculate a minimum power point for the load 140. The duty cycle of the switches 120, 130 may be adjusted to track a minimum power point. Referring to FIG. 5, each of the static VAR compensator apparatus 512 may be configured to measure load characteristics associated with each of the respective gateways 516 and to determine whether to modulate between the first state and the second state based on a minimum power-point tracker algorithm and/or determine a duty cycle.

The mPPT algorithm may be implemented using two automatic control loops. A first loop may regulate a load voltage at a residence to any desired voltage within a particular range (such as a voltage range set for a particular application by a standards organization). A second loop may adjust a reference voltage to track the point of minimum power consumption by the load at the residence. In that way, the system may adapt to the dynamic nature of a particular load, which may, at some times, decrease its power consumption under a reduced voltage, and may, at other times, not decrease its power consumption.

Figure 6:
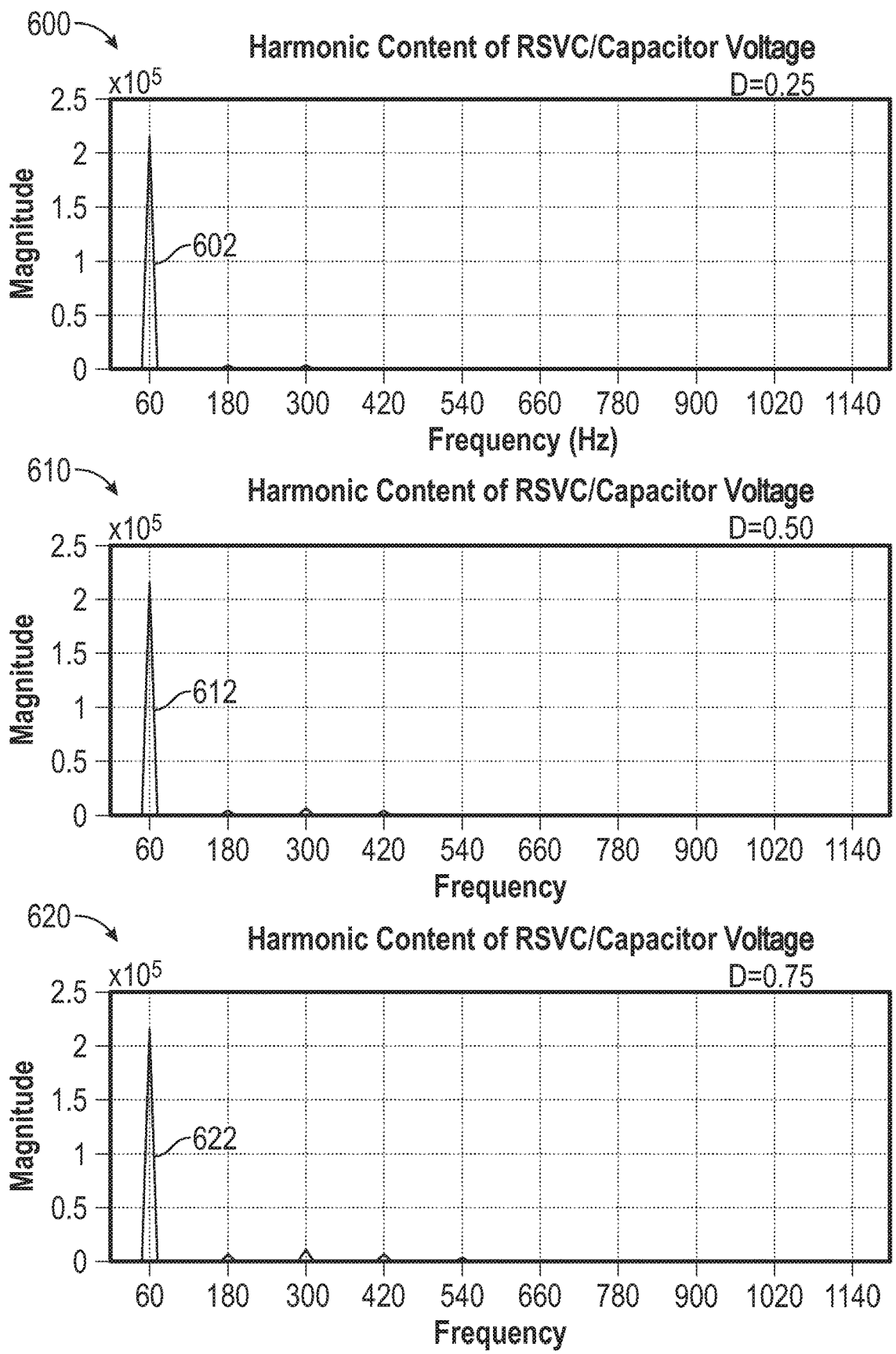
FIG. 6 depicts multiple graphs showing simulated frequency responses of a single phase power signal across a load at different duty cycles applied to switches of an embodiment of a static residential VAR apparatus.

Referring to FIG. 6, multiple graphs 600, 610, 620 depict simulated frequency responses 602, 612, 622 of a single phase power signal across a load (e.g., the load 140 of FIG. 1) at different duty cycles applied to switches of a static residential VAR apparatus (e.g., the apparatus 110). The graph 600 is associated with a duty cycle of 0.25. Harmonics within the signal 602 are virtually non-existent. The graph 610 is associated with a duty cycle of 0.50. While some harmonics can be seen developing at around 180 Hz and 300 Hz within the signal 612, these harmonics are well within a range that they will have little significance. The graph 620 is associated with a duty cycle of 0.75. Slightly more developed harmonics may develop at 180 Hz, 300 Hz, and 420 Hz. In all three cases, the harmonics are negligible. In most cases substantial harmonics filtering between a phase conductor and a load would not likely be required.

Figure 7:
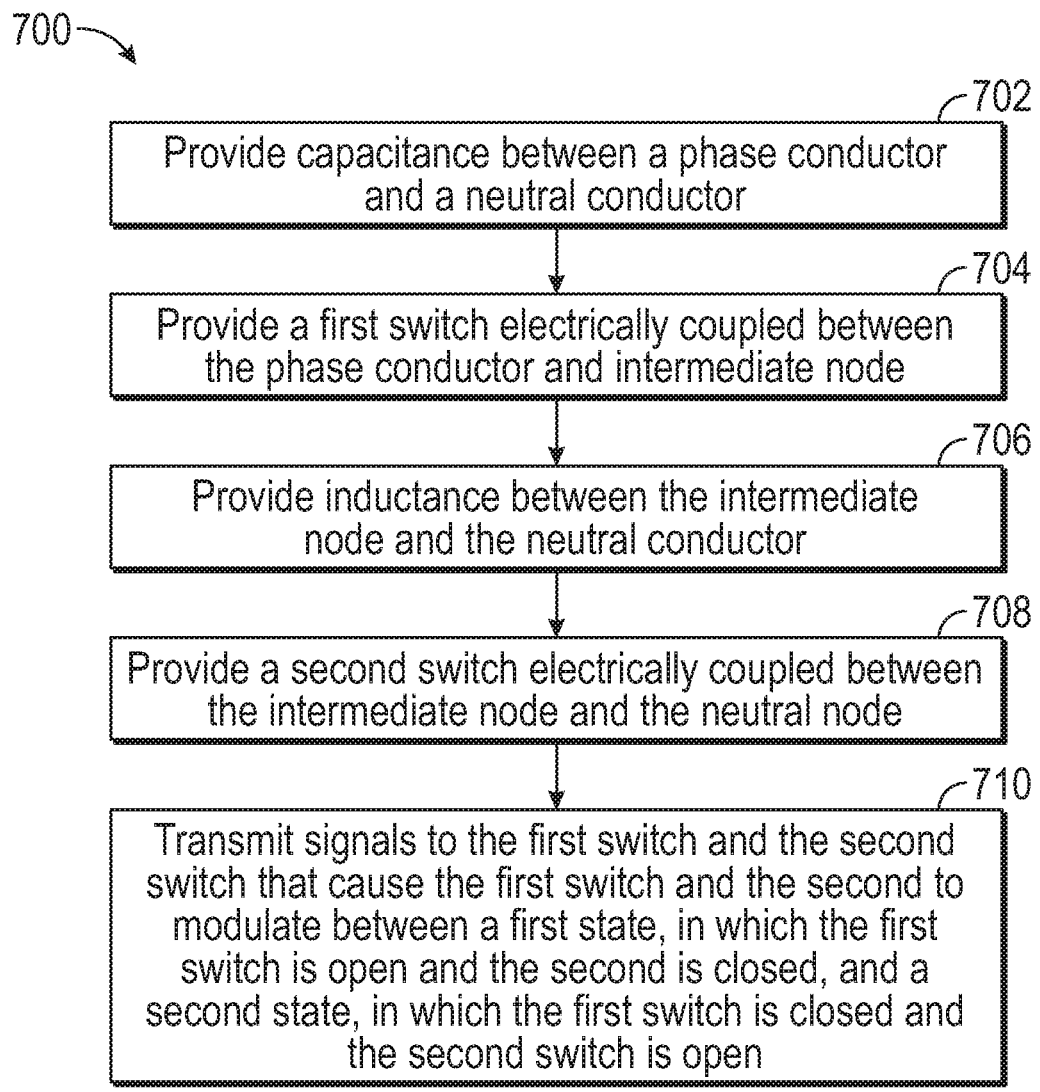
FIG. 7 depicts an embodiment of a method for static VAR compensation.

Referring to FIG. 7, a method 700 for static VAR compensation is depicted. The method 700 may include providing capacitance between a phase conductor and a neutral conductor, at 702. For example, the capacitor 112 may provide capacitance between the phase conductor 104 and the neutral conductor 106.

The method 700 may further include providing a first switch electrically coupled between the phase conductor and an intermediate node, at 704. For example, the first switch 120 may be coupled between the phase conductor 104 and the intermediate node 114.

The method 700 may also include providing inductance between the intermediate node and the neutral conductor, at 706. For example, the inductor 116 may provide inductance between the intermediate node 114 and the neutral conductor 106.

The method 700 may include providing a second switch electrically coupled between the intermediate node and the neutral node, at 708. For example, the second switch 130 may be coupled between the intermediate node 114 and the neutral conductor 106.

The method 700 may include transmitting signals to the first switch and the second switch that cause the first switch and the second switch to modulate between a first state, in which the first switch is open and the second switch is closed, and a second state, in which the first switch is closed and the second switch is open, at 710. For example, the controller 118 may transmit signals to the first switch 120 and the second switch 130.

Although various embodiments have been shown and described, the present disclosure is not so limited and will be understood to include all such modifications and variations as would be apparent to one skilled in the art.

What is claimed is:

1. A static volt-ampere reactive (VAR) compensator apparatus comprising:
    a capacitor electrically coupled between a phase conductor and a neutral conductor;
    a first switch electrically coupled between the phase conductor and an intermediate node, the first switch comprising a first sub-switch and a second sub-switch;
    an inductor electrically coupled between the intermediate node and the neutral conductor in series with the first switch;
    a second switch electrically coupled between the intermediate node and the neutral conductor in parallel with the inductor, the second switch comprising a third sub-switch and a fourth sub-switch; and
    a controller configured to transmit signals to the first switch and the second switch that cause the apparatus to modulate between a first steady state, in which the first sub-switch and the second sub-switch are open and the third sub-switch and fourth sub-switch are closed, and a second steady state, in which the first sub-switch and the second sub-switch are closed and the third sub-switch and fourth sub-switch are open, wherein the apparatus passes between the first steady state and the second steady state according to a first set of intermediate states when a voltage at the phase conductor is positive, and wherein the apparatus passes between the first steady state and the second steady state according to a second set of intermediate states when the voltage at the phase conductor is negative.

2. The apparatus of claim 1, wherein the phase conductor is configured to receive a single phase power signal therethrough.

3. The apparatus of claim 1, wherein the apparatus passes between the first steady state and the second steady state according to the first set of intermediate states when a current through the inductor from the phase conductor to the neutral conductor is positive, and wherein the apparatus passes between the first steady state and the second steady state through the second set of transient states when the current through the inductor from the phase conductor to the neutral conductor is negative.

4. The apparatus of claim 1, wherein the first switch is a bidirectional switch, wherein the first sub-switch and the second sub-switch are paired with respective diodes electrically coupled in an antiparallel configuration, wherein the second switch is a bidirectional switch, and wherein the third sub-switch and the fourth sub-switch are paired with additional respective diodes electrically coupled in an antiparallel configuration.

5. The apparatus of claim 1, wherein the controller is configured to suspend the modulation between the first steady state and the second steady state when a voltage at the phase conductor is within a threshold voltage of zero.

6. The apparatus of claim 5, wherein the controller is configured to return the apparatus to the first steady state before suspending the modulation between the first steady state and the second steady state.

7. The apparatus of claim 1, wherein a duty cycle of the first switch and the second switch is adjustable to alter an effective inductance of the apparatus.

8. The apparatus of claim 1, wherein a modulation frequency of the first switch and the second switch is between 3 kHz and 12 kHz.

9. A power distribution system comprising:
a feeder including a phase conductor and a neutral conductor; and
one or more static volt-ampere reactive (VAR) compensator apparatuses positioned between the feeder and one or more respective gateways, each static VAR compensator apparatus comprising:
a capacitor electrically coupled between the phase conductor and the neutral conductor;
a first switch electrically coupled between the phase conductor and an intermediate node;
an inductor electrically coupled between the intermediate node and the neutral conductor in series with the first switch;
a second switch electrically coupled between the intermediate node and the neutral conductor in parallel with the inductor; and
a controller configured to transmit signals to the first switch and the second switch that cause the VAR compensator apparatus to modulate between a first steady state, in which the first switch is open and the second switch is closed, and a second steady state, in which the first switch is closed and the second switch is open,
wherein each static VAR compensator apparatus is configured to measure load characteristics associated with the respective gateways and to determine whether to modulate between the first steady state and the second steady state based on a minimum power-point tracker algorithm.

10. The system of claim 9, wherein the phase conductor is configured to receive a single phase power signal therethrough.

11. The system of claim 9, wherein each VAR compensator apparatus passes between the first steady state and the second steady state through a first set of transient states when a voltage at the phase conductor is positive, and wherein the apparatus passes between the first steady state and the second steady state according to a second set of transient states when the voltage at the phase conductor is negative.

12. The system of claim 9, wherein each VAR compensator apparatus passes between the first steady state and the second steady state through a first set of transient states when a current through the inductor from the phase conductor to the neutral conductor is positive, and wherein the apparatus passes between the first steady state and the second steady state through a second set of transient states when the current through the inductor from the phase conductor to the neutral conductor is negative.

13. The system of claim 9, wherein the first switch is a bidirectional switch having a first switch-diode pair and a second switch-diode pair electrically coupled in an antiparallel configuration, and wherein the second switch is a bidirectional switch having a first switch-diode pair and a second switch-diode pair electrically coupled in an antiparallel configuration.

14. The system of claim 9, wherein the controller is configured to suspend the modulation between the first steady state and the second steady state when a voltage at the phase conductor is within a threshold voltage of zero.

15. The system of claim 9, wherein a modulation frequency of the first switch and the second switch is adjustable to alter an effective inductance of each individual apparatus.

16. The system of claim 9, wherein the system does not include harmonic filter devices between the feeder and each of the respective gateways.

17. The system of claim 9, further comprising at least one additional VAR compensator apparatus positioned between the feeder and at least one additional gateway.

18. A method comprising:
providing capacitance between a phase conductor and a neutral conductor;
providing a first switch electrically coupled between the phase conductor and an intermediate node, the first switch comprising a first sub-switch and a second sub-switch;
providing inductance between the intermediate node and the neutral conductor;
providing a second switch electrically coupled between the intermediate node and the neutral node, the second switch comprising a third sub-switch and a fourth sub-switch;
transmitting signals to the first switch and the second switch modulating the first switch and the second switch between a first steady state, in which the first sub-switch and the second sub-switch are open and the third sub-switch and the fourth sub-switch are closed, and a second steady state, in which the first sub-switch and the second sub-switch are closed and the third sub-switch and the fourth sub-switch are open, wherein modulating between the first steady state and the second steady state further comprises passing between the first steady state and the second steady state according to a first set of intermediate states when a voltage at the phase conductor is positive, and passing between the first steady state and the second steady state according to a second set of intermediate states when the voltage at the phase conductor is negative.

19. The method of claim 18, further comprising receive a single phase power signal through the phase conductor.

* * * * *